United States Patent
Onyeche et al.

(10) Patent No.: US 6,444,124 B1
(45) Date of Patent: Sep. 3, 2002

(54) SYSTEM AND METHOD FOR IMPROVED TREATMENT OF WASTEWATER

(76) Inventors: Theodore Onyeche, Berliner Str. 32, 38678 Clausthal-Zellerfeld (DE); Michael Sievers, Tannenhöhe 10, 38678 Clausthal-Zellerfeld (DE)

( * ) Notice: Subject to any disclaimer, the term of this patent is extended or adjusted under 35 U.S.C. 154(b) by 41 days.

(21) Appl. No.: 09/648,047

(22) Filed: Aug. 25, 2000

(30) Foreign Application Priority Data

Aug. 27, 1999 (DE) ......................... 199 40 994

(51) Int. Cl.[7] ............... C02F 3/28; C02F 3/30; C02F 11/04
(52) U.S. Cl. ............ 210/603; 210/609; 210/630; 210/202; 210/259; 210/512.1
(58) Field of Search ............... 210/603, 605, 210/606, 609, 612, 613, 620, 623, 630, 173, 181, 195.1, 195.3, 220, 259, 202, 252, 360.1, 532.1, 512.1; 241/2, DIG. 38

(56) References Cited

U.S. PATENT DOCUMENTS

| | | | |
|---|---|---|---|
| 1,355,476 A | 10/1920 | Hering | 422/39 |
| 1,711,097 A | 4/1929 | Kratzer | 422/39 |
| 2,069,820 A | 2/1937 | Dodge | 422/33 |
| 3,658,262 A | 4/1972 | Burant, Jr. | 241/46.01 |
| 3,718,582 A | 2/1973 | Smith et al. | 210/610 |
| 3,938,066 A | 2/1976 | Morrill, Jr. | 335/154 |
| 4,042,494 A | 8/1977 | Stoyer | 210/607 |
| 4,050,907 A * | 9/1977 | Brimhall | |
| 4,123,426 A | 10/1978 | Katayama et al. | 530/407 |
| 4,190,528 A | 2/1980 | Dassen | 210/609 |
| 4,192,741 A | 3/1980 | Deeks | 210/605 |
| 4,246,099 A * | 1/1981 | Gould et al. | |
| 4,261,836 A | 4/1981 | Koglin | 210/737 |
| 4,511,370 A * | 4/1985 | Hunziker et al. | |
| 4,629,785 A | 12/1986 | McCaffery, III | 530/415 |
| 4,762,527 A | 8/1988 | Beshore et al. | 44/51 |
| 4,784,770 A | 11/1988 | Nagao | 210/603 |
| 4,985,149 A | 1/1991 | Ohshima et al. | 210/603 |
| 5,188,741 A | 2/1993 | Zang et al. | 210/774 |
| 5,240,599 A * | 8/1993 | Kew et al. | |
| 5,282,980 A | 2/1994 | Kew et al. | 210/787 |
| 5,316,745 A | 5/1994 | Ting et al. | 422/295 |
| 5,509,609 A | 4/1996 | Kamler | 239/461 |
| 5,593,591 A | 1/1997 | Ohsol et al. | 210/609 |
| 5,785,852 A | 7/1998 | Rivard et al. | 210/613 |
| 5,846,425 A | 12/1998 | Whiteman | 210/606 |
| 6,013,183 A | 1/2000 | Stephenson et al. | 210/606 |
| 6,171,499 B1 * | 1/2001 | Bouchalat | |
| 6,299,774 B1 * | 10/2001 | Ainsworth et al. | |

FOREIGN PATENT DOCUMENTS

DE 4030668 4/1992

OTHER PUBLICATIONS

Publication by Norbert Dichtl et al., entitled "Desintegration von Klärschlamm–ein aktueller Überblick," *Korrespondez Abwasser* (44), No. 10, pp. 1726–1739 (1997).

* cited by examiner

*Primary Examiner*—David A. Simmons
*Assistant Examiner*—Fred Prince
(74) *Attorney, Agent, or Firm*—Leydig, Voit & Mayer, Ltd.

(57) ABSTRACT

A method and system for treating sludge in a wastewater facility involving a novel concentration step optimises the energy balance and sludge solids mass reduction incurred from concentration and low pressure homogenization of the sludge.

22 Claims, 5 Drawing Sheets

SYSTEM AND METHOD FOR IMPROVED TREATMENT OF WASTEWATER

FIELD OF THE INVENTION

This invention relates generally to the art and science of wastewater treatment, and more particularly, to a process and system for optimising the energy balance associated with the energy consumed during downstream processing of sludge from the wastewater, as compared to the energy yield, and reduction of solids mass associated with such processing.

BACKGROUND OF THE INVENTION

Industrial and municipal entities treat wastewater to prevent the contamination and pollution of local receiving waters and potable water supplies. Such treatment facilities are designed to remove inorganic and organic pollutants from the wastewater using various biological aerobic and anaerobic processes.

In general, industrial and municipal entities incur substantial costs in the operation of these wastewater treatment facilities. In addition to utility costs to operate the necessary machinery and mechanical systems, a facility also typically incurs substantial costs for the disposal of waste sludge generated by the various treatment processes. Sludge produced during wastewater treatment includes primary sludge from the pre-purification stage and biologically activated sludge from aerobic digestion. Stabilised sludge may be produced through the subsequent application of anaerobic digestion of biologically activated sludge with or without the addition of primary sludge. In some wastewater treatment facilities, these sludges are disposed by incineration, landfill, or spread as fertilizer over agricultural fields. All of these disposal methods result in expensive costs to the facility. Based on these substantial operational and disposal costs, it would be desirable to optimise the energy consumption for processing the wastewater and sludge to attain an improved quality of wastewater discharge and/or reduction in sludge disposal costs.

Anaerobic digestion is a microbiological process in which organic materials are broken down by the action of micro-organisms in the absence of oxygen. The anaerobic micro-organisms reduce the quantity of organic matter present in the biologically activated sludge thereby generating bio-gas having a relatively high methane gas content. The stabilised sludge is typically removed from a digestion tank for dewatering and disposal. The methane gas can be burned off or recovered to supply energy to heat the digesters as well as supply energy for use elsewhere in the treatment facility.

In dewatering processes, water is mechanically squeezed or separated from the sludge stream. Most advancements in this field of technology have sought to optimise the energy consumed in processing the sludge with the reduction in the volume of sludge disposed. Additionally the disruption technologies have sought to optimise the mass reduction of sludge for disposal.

An overview of conventional disruption methods can be found in a publication by N. Dichtl, J. Müller, E. Engelmann, F. Günthert, M. Osswald entitled, *Desintegration von Klärschlamm—ein aktueller Überblick in: Korrespondenz Abwasser,* (44) No. 10, pp. 1726–1738 (1997). This publication describes three mechanical disruption techniques: (1) stirred ball mills; (2) high-pressure homogenisers; and (3) ultrasonic homogenisers. With the aid of these disruption methods, the micro-organisms and particulate solids in sludge are essentially comminuted or chopped-up. For example, the cellular walls of microorganisms and particulates present in sludge may be destroyed when the external pressure exceeds the cell internal pressure with the use of a homogeniser. The cell contents, which are separated from the exterior by the cell wall, are thereby released and become available for subsequent digestion.

An advantage of these disruption processes when applied to sludge is that the anaerobic micro-organisms are also disrupted together with the aerobic micro-organisms, in contrast to other methods in which such micro-organisms at least partly survive the disruption process. They remain in the disposed sludge as organic residue. A second advantage of disruption is that organic substances contained within the cellular contents of the sludge are released to the micro-organisms during the disruption process. In this way, they serve as internal sources of carbon to support de-nitrification in the digestion process.

Another publication concerning disruption of primary sludge using ultrasonic homogenisers is described in G. Lehne, J. Müller: "The Influence Of The Energy Consumption On The Sewage Sludge Disruption," *Technical University Hamburg—Harburg Reports On Sanitary Engineering,* No. 25, pp. 205–215 (1999). The Lehne et al. publication describes that cell disruption is greater when the amount of cavitation bubbles in the vicinity of an ultrasonic probe is higher. The amount of cavitation bubbles is proportional to the intensity of the ultrasonic probe. Further study of the optimisation of the ultrasonic probe intensities was necessary in order to optimise the energy balance. A comparison of the ultrasonic homogeniser with high-pressure homogeniser and ball stirring mill provided comparable results in this process. However, mechanical problems, due to coarse material, occurred in the high-pressure homogeniser and ball stirring mill.

Disruption of the organic content in stabilised sewage sludge is also described in H. Grüning: "Einfluss des Aufschlusses von Faulschlämmen auf das Restgaspotential." This article describes that, in processing anaerobic stabilised sewage sludge, gas production is considerably increased by prior disruption using ultrasound. An article by J. Müller, N. Dichtl, J. Schwedes, "Klärschlammdesintegration—Forschung und Anwendung", *Publication of the Institute for Settlement Water Economy of the Technical University Braunschweig,* No. 61, Conference on the 10$^{th}$ and 11th of March 1998 in Braunschweig, pp. 180–191 (March 1998) discloses the use of a high-pressure homogeniser to disrupt stabilised sludge at pressures in the range of 500 to 1000 bar. Accordingly, they subscribe to conventional wisdom, which dictates that increased homogeniser pressures should be employed in order to increase the degree of disruption of the microbial sludge cells. Under this assumption, the amount of cell disruption increases in proportion to the degree of energy input. Accordingly, attempts so far have generally been directed to the application of disruption and/or anaerobic digestion of unconcentrated biologically activated sludge to reduce volume which has to be disposed.

A general description of the effects of sludge concentration and disruption of stabilised sludge can be found in T. Onyeche, O. Schläfer, H. Klotzbücher, M. Sievers, A. Vogelpohl: "Verbesserung der Energiebilanz durch Feststoffseparation bei einem kombinierten Verfahren aus Klärschlammdesintegration und Vergärung," *DechemaJahrestagungen* 1998, Volume II, pp. 117–118 (1998). This article teaches that the sludge solids content can be concentrated using a decanter and thereafter homogenized. However, the high-pressure homogenisers used in this reference are operated at pressures of at least 500 bar. In any event, this article fails to adequately solve problem of optimising the energy balance of the system.

U.S. Pat. No. 6,013,183, which issued Jan. 11, 2000, discloses the application of high pressure homogenisation to biologically activated sludge. The sludge is homogenised at a pressure drop in excess of 5000 PSI (350 bar) across the homogenisation nozzle as a means of improving the reduction of volatile total solids when the liquefied biological activated sludge is recycled back to the aerobic digester. The patent also discloses the application of high pressure homogenisation of biologically activated sludge prior to anaerobic digestion, but it fails to address what, if any, treatment should be applied to primary sludge, or to further processing of stabilised sludge. Moreover, the issue of achieving a positive energy balance, such as through prior concentration of the sludge, is not addressed.

U.S. Pat. No. 4,629,785, which issued Dec. 16, 1986, disclosed the application of high pressure homogenisation to both biologically activated sludge and stabilised sludge at pressures of up to 12,000 PSI (825 bar) prior to recovery of proteins in the sludge. This patent similarly excludes treatment of primary sludge and does not address energy recovery through production of methane gas during anaerobic digestion of the liquefied sludge.

Notwithstanding the above-described methods for treating sludge, a need for optimising the energy balance of the disruption process to minimize energy costs exists. The possible benefit of concentrating sludge prior to homogenisation has not previously been disclosed. In optimising the energy balance, it would be desirable to determine when the energy required to disrupt and otherwise pretreat primary and/or secondary sludge is about the same as, or considerably lower than, the energy obtained through additional methane gas yield. In this regard, it would also be desirable to optimise the disruption process in such a manner that the methane gas produced during the sludge digestion processes can be used as a source of energy to self-sustain the disruption process as well as other treatment processes. Accordingly, there is a need for a wastewater treatment system that positively balances the energy required to disrupt a sludge stream with the energy yield due to an increased production of methane gas (which can be converted to electrical energy).

SUMMARY OF THE INVENTION

Accordingly, it is a general object of the invention to overcome the deficiencies in the wastewater treatment art.

It is another object of this invention to optimise the energy balance associated with the energy consumed for processing of sludge produced during wastewater treatment and the energy yield obtained from the increased production of methane gas during anaerobic digestion of sludge.

It is a further object of this invention to provide a system and method that disrupts cellular walls of micro-organisms present in stabilised sludge in order to release nutrients for enhancing the sludge digestion process, and thus reducing the mass of stabilised sludge which must be disposed.

These and other additional objects and advantages are achieved in a unique combination of methods and systems for treating sludge generated in a waste water treatment facility according to the present invention. The method comprises increasing the solids concentration in primary, biologically activated, and stabilised sludge or any mixture thereof which undergoes anaerobic digestion. In a preferred embodiment, a homogeniser, operating within an economically viable low-pressure range, then disrupts the cellular walls of the various micro-organisms in the concentrated sludge, thereby releasing nutrients from within the cells. Disruption can occur either continuously or discontinuously. The disrupted sludge is subsequently supplied to a digestion tank, providing additional nutrients to enhance the production of methane gas. In this way, the invention optimises the energy demand in concentrating and homogenising the sludge as compared with the energy yield from the increased production of methane gas generated during the digestion process.

In accordance with one aspect of the invention, a positive energy balance is achieved with the use of a concentrated sludge having a high solids concentration that is processed under a reduced homogeniser pressure. The sludge is preferably concentrated by a factor of about 1.5 or greater prior to being processed with a homogeniser. Also, the homogeniser is preferably operated at a low-pressure range of less than 400 bar. In this range, the disruption step operates self-sufficiently, and even provides excess energy. This invention ascertained that the high-pressure homogeniser should advantageously be operated at a pressure of 50 to 400 bar, where the optimum is at the lower range of 100 or 200 bar. As explained below, even lower pressures may be achieved with the use of particular equipment, such as the APV Micro-Gap or Super Micro-Gap range of homogeniser valves.

In accordance with one alternative feature of the invention, the sludge undergoes a classification process prior to disruption. In this way, solid material particles are removed from the sediment sludge before they reach the homogeniser. The efficiency of homogenisation is improved in this manner. For example, classification of the sludge can take place with the use of a wet sieve device or sieve.

DETAILED DESCRIPTION OF THE PREFERRED EMBODIMENT

In general, the present invention provides a method and system for optimizing the energy balance associated with the energy consumed for treatment of waste water sludge prior to anaerobic digestion and the energy yielded from such treatment in the form of methane gas production. In accordance with the invention, activated sludge is mechanically disintegrated or disrupted to release nutrients that enhance the digestion process. In this manner, anaerobic digestion of the disrupted sludge is improved, resulting in decreased digestion time, decreased solids concentration, and increased production of methane gas. The resultant methane gas may preferably be converted into energy to self-sustain operation of the disruption system, as well as supply energy to other aspects and subsystems in the wastewater treatment facility.

Figure 1:
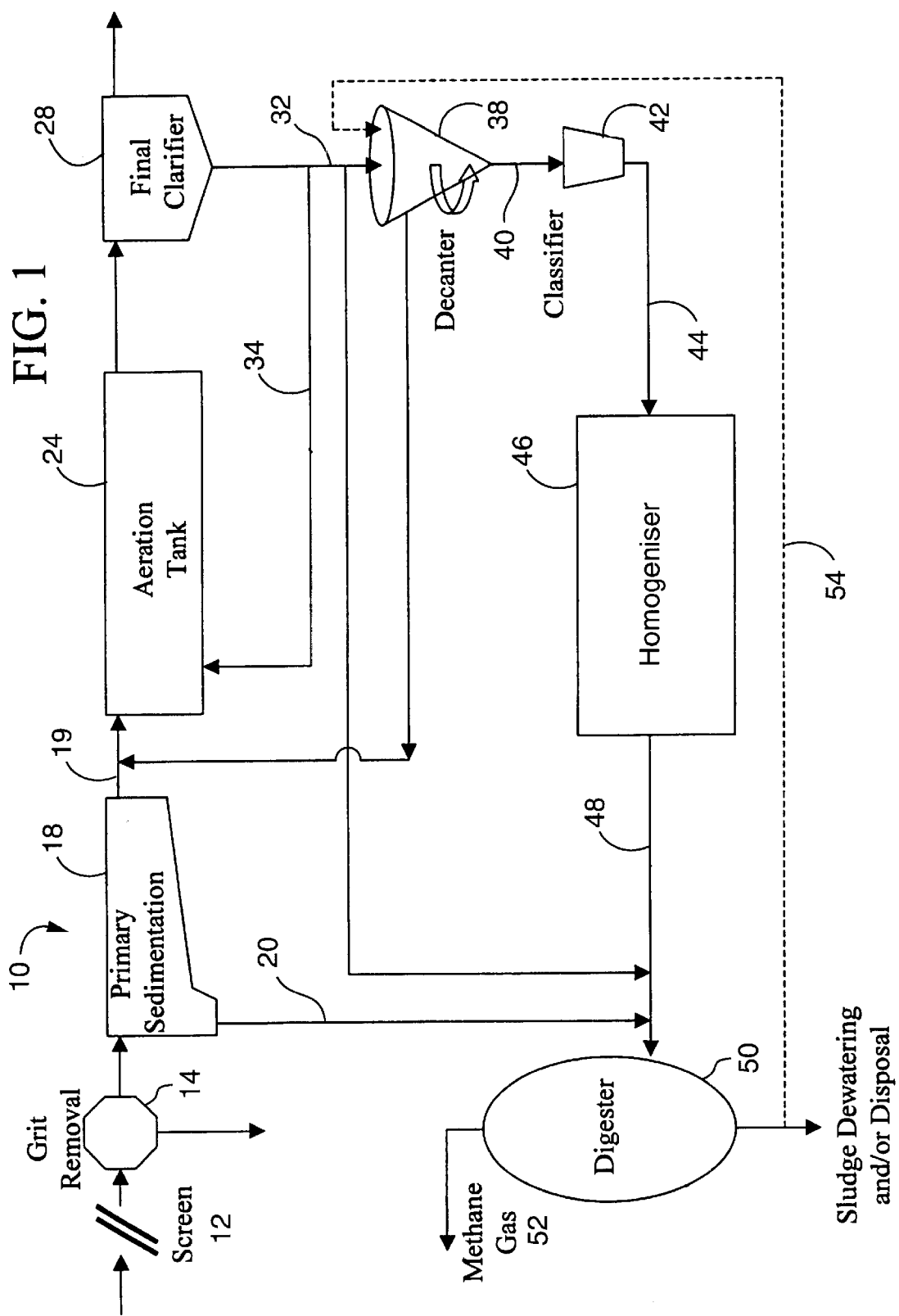
FIG. 1 is a simplified block diagram representation of a wastewater treatment system according to one embodiment of the present invention.

By way of background, a wastewater treatment system cleans wastewater before it is discharged into a receiving stream. FIG. 1 is a schematic block diagram of one such wastewater treatment system 10 that may be used by a municipality or the like. Typically, industrial or municipal wastewater initially passes along a flow path through a bar screen 12 and other grit removal apparatus 14 for removing such materials as grit that may otherwise be harmful to equipment employed in subsequent treatment of the wastewater. Next, the filtered wastewater empties into a primary sedimentation tank 18 to settle out the heavy sediments, which are typically inorganic. This waste material is sometimes referred to by those skilled in the art as primary sludge. In many implementations, the primary sludge is passed to a digester 50 for decomposition as indicated by a flow path 20.

The primary effluent flows from the primary sedimentation tank 18 to an aeration tank or basin 24 along a flow path 19 where the raw wastewater is treated with micro-organisms in the presence of dissolved oxygen. In general, the aerobic micro-organisms consume the organic particulates suspended in the wastewater. In this way, the treatment microorganisms reduce contaminants present in the wastewater as well as the biological oxygen demand.

For settling solid sludge containing the micro-organisms, the mixed liquor flows from the aeration tank 24 into a final clarifier 28. In this stage of the process, flocculation and gravity settling separate the water from suspended particulates and solids, known as biologically activated (or secondary) sludge.

Settled sludge is removed from the final clarifier 28 and typically follows various flow paths. For example, some of the sludge may be pumped back into the aeration tank 24 along a flow path 34 to seed the growing system. The activated sludge that is re-circulated to the aeration tank 24 is sometimes called return biologically activated sludge. At least a certain amount of excess sludge exiting the final clarifier 28 may also pass to an anaerobic digester 50 for digestion along a flow path 32.

In accordance with one aspect of the present invention, a processing step is applied to the sludge entering anaerobic digestion apparatus for providing a greater concentration of solids in the sludge prior to disruption and digestion thereof. As shown in FIG. 1, before the sludge is disrupted and emptied into the digester 50 for digestion, at least a partial stream undergoes treatment in a decanter 38 and a classifier 42. The decanter 38 is typically a centrifuge or other circular motion device that rapidly separates the liquid phase from the solid phase of the sludge stream supplied thereto. In a preferred embodiment, the decanter 38 concentrates the solids in the sludge by a factor of at least 1.5. The decanted water that is separated from the waste activated sludge can be returned to the headworks or inlet waste water treatment stream for further processing.

Following the decanting step, the concentrated sludge is passed to a classifier 42 along a flow path 40. The classifier 42 removes troublesome materials (e.g., grit) that may be harmful to the ensuing high-pressure homogeniser 46 and/or harmful to agricultural landspreading. Thereby, the reliability of the operation of the high-pressure homogeniser 46 is improved and the disruption efficiency of the sludge is increased. An example of a classifier 42 is a grit vortex device, which utilizes rotary motion and gravity settling to separate the heavy solids from the lighter materials in the sludge stream. The order of the decanting and classifying steps in the process may be reversed.

For breaking up micro-organisms in the concentrated sludge with a desired applied shear force, the concentrated (and preferably classified) sludge is preferably supplied to a high-pressure homogeniser 46 along a flow path 44. The high-pressure homogeniser 46 consists of a high-pressure pump and homogenizing valve as will be understood by those skilled in the art. In general, such homogenisers employ high pressure pumps which force fluid, in this case concentrated sludge, through a valve or nozzle having a restricted flow area. As the fluid flows through the restriction, the velocity increases and the pressure decreases as high-pressure potential energy is converted to kinetic energy. In one preferred embodiment, the homogeniser valve is implemented as an APV homogenizing valve, marketed under the tradename of Micro-Gap or Super Micro-Gap. The Super Micro-Gap homogenising valve is generally described in U.S. Pat. No. 5,749,650, issued on May 12, 1998, and in U.S. Pat. No. 5,899,564, issued on May 4, 1999. The subject matter of these patents is incorporated herein by reference in their entirety. With this implementation, the invention may achieve an even greater operating efficiency. That is, the Super Micro-Gap homogenizing valve may provide operation at about a 20 per cent reduction in pressure (and with a concommitent lower energy input) as compared with other homogenizing valves and still achieve the same amount of disruption.

The high-pressure pump in homogeniser 46 pressurizes and compresses the received sludge stream. The pressure on the sludge stream is subsequently reduced by the ambient pressure through a gap in the adjustable valve body of the homogenizing valve (not shown). As the pressure is reduced, the liquid velocity of the sludge stream is considerably increased. In a preferred embodiment, the pressure is reduced to the point that the steam pressure of the liquid remaining in the sludge stream is reached, forming steam bubbles or cavitation bubbles. The steam bubbles further increase the flow velocity of the sludge stream to the point of supersonic flow, leading to cavitation thrusts. Ultimately, the cavitation bubbles collapse and energy-rich friction velocity fields are formed, causing the cellular contents of the micro-organisms in the sludge to be disrupted. Upon exiting the homogeniser valve, the sludge stream passes through an impact ring to reduce the flow velocity of the suspension.

For decomposition thereof, the disrupted sludge stream is then provided along a flow path 48 to a digester 50. Particularly with anaerobic digestion, one of the byproducts of the digestion process is methane gas. The methane gas can be recovered (such as along flow path 52) and converted to energy, particularly electrical energy. In this way the converted energy may be used to operate the various electrical devices and subsystems utilized in the wastewater treatment system. The stabilized, digested sludge typically undergoes further dewatering treatment and is thereafter disposed. As shown in FIG. 1, stabilized, digested sludge may optionally be returned from the anaerobic digester 50 to the decanter along the flow path 54. Ultimately, the sludge is disrupted by the high-pressure homogeniser 46.

While various operating pressures may be utilized, the high-pressure homogeniser 46 is preferably operated at pressures of about 50 to 400 bar. With the present invention, cell disruption occurs in a lower pressure range as compared with known implementations, i.e. in the pressure range of approximately 100 to 200 bar. In some embodiments, the pressure range of the homogeniser is operated at an even lower range so long as the shear forces applied to the micro-organisms are sufficiently large to break up the cellular walls thereof.

A positive energy balance of this invention can be attained by targeting the influence on the high-concentration of the sludge with the decanter 38 and by classification using the classifying device 42. In this way, the possible energy yield from generated methane gas provides greater energy than can be used up by the disruption step in the process.

The positive energy balance can be attained by concentrating the wasted sludge by a factor of at least 1.5 and by using a high-pressure homogeniser 46 at a relatively lower pressure range for cell disruption as compared to known disruption pressures. The method can be further optimised if the biologically activated sludge is mixed with primary sludge before the concentration and disruption steps. Thereby, digestion of the sludge and thus the resultant gas yield are increased.

Figure 2:
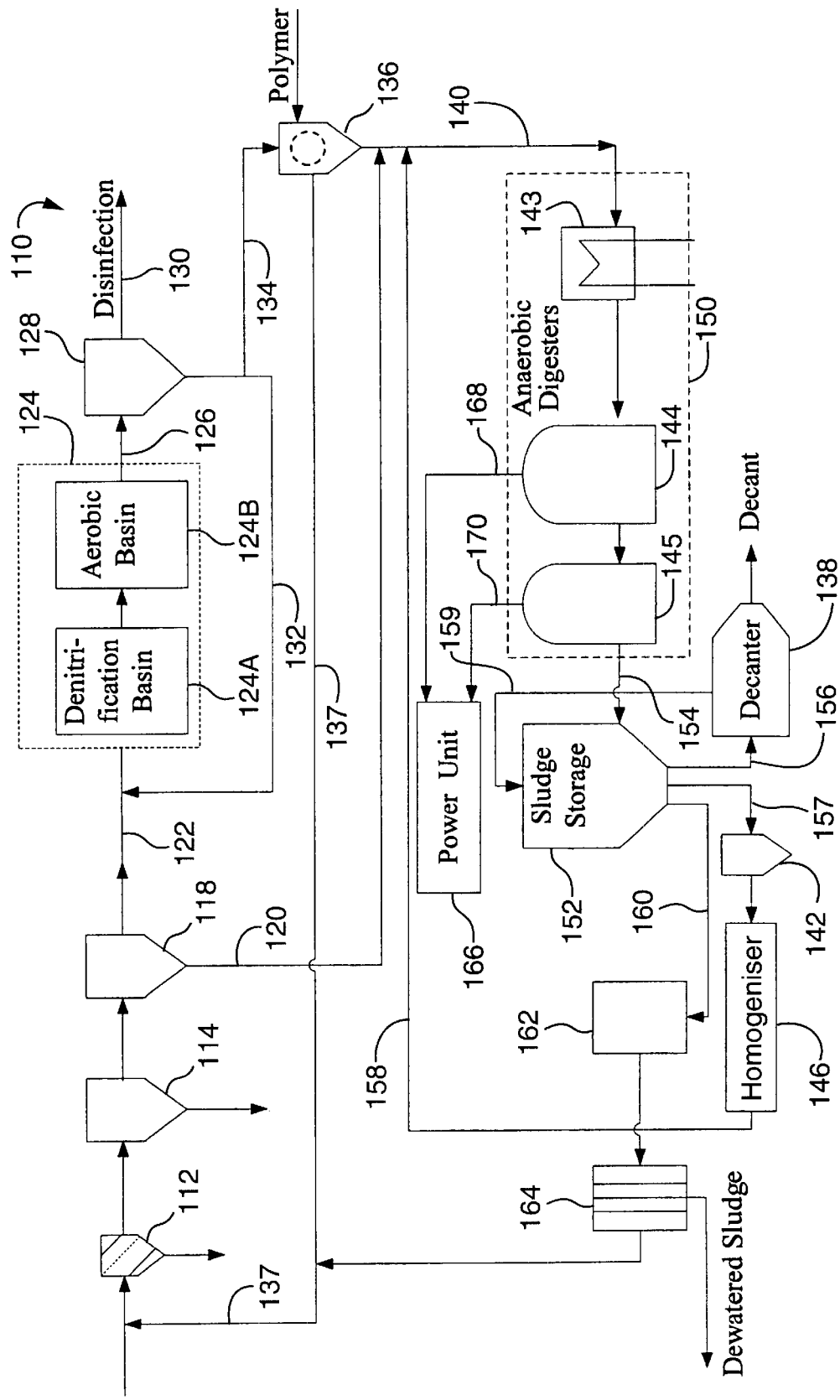
FIG. 2 is a block diagram representation of a wastewater treatment system according to a second embodiment the present invention.

FIG. 2 shows an alternative embodiment of a wastewater treatment facility 110 according to the present invention, although somewhat similar to the process and system shown in FIG. 1. In this embodiment, raw wastewater initially passes through the bar screen 112 and sand collection device or grit classifier 114 before emptying into a prepurification or primary sedimentation tank 118. The prepurification tank 118 utilizes gravity settling to separate the heavy sediments (primary sludge) from the wastewater. Thus, for a treatment plant with an average raw wastewater inflow of about 2.15 million gallons per day (mgd), primary sludge may be generated at a rate of about 3,000 pounds per day (lbs/d) solids.

In accordance with one particular implementation of the invention, the sludge may be further pretreated prior to disruption or digestion with enhanced removal of heavy metals from the sludge. In FIG. 2, the classifier 114 may accomplish such enhanced heavy metal removal through methods such as the addition of vegetable oil or other suitable substance. Such removal improves methane gas production since heavy metals are generally toxic to the micro-organisms in the sludge. However, the methodology used for heavy metal removal preferably does not itself materially effect the micro-organisms in the sludge. This feature advantageously permits dewatered sludge exiting the system to be used as manure or in other agricultural applications without causing ecological damages.

The water discharged from the tank 118, called primary effluent, is passed along a flow path 122 to an aerobic digestion section 124. In this embodiment, the aerobic section 124 consists of a denitrification basin 124A and a stimulated (or aerobic) basin 124B. The denitrification basin 124A is operated under anoxic, or oxygen-reduced conditions, which enhances denitrifying bacteria in the removal of nitrates from the wastewater. Otherwise, the release of nitrates to the environment leads to the eutrophication of lakes and streams as well as the pollution of potable water supplies. Following denitrification, the wastewater enters the aerobic zone 124B where oxygen is delivered to enhance aerobic micro-organisms in the removal of organic material in the wastewater. The mixture of wastewater with a seed of aerobic micro-organisms is referred to as mixed liquor.

Following treatment in the aeration tank 124, the mixed liquor empties via a flow path 126 into a settling tank(s) 128 for clarification. Clarification utilizes flocculation and gravity settling to separate the water phase from the suspended solids and particulates. This water phase may be directed to a disinfection process along a flow path 130 before release, as will be understood by those skilled in the art.

In the embodiment shown in FIG. 2, a portion of the activated sludge stream exiting the settling tank(s) 128 is returned back to the aerobic digestion section 124 along the return flow path 132 for reseeding the system. The remaining sludge stream is directed along a flow path 134 to a sludge concentrator or thickener 136. In one embodiment, for raw wastewater supplied at an average inflow of 2.15 mgd that requires a biochemical oxygen demand of about 214 milligrams per liter (mg/l), the treatment wastes biologically activated sludge at a rate of approximately 1,000 lbs/d solids. The sludge thickener or sieve 136 typically intermixes the activated sludge with a polymer to enhance the coagulation of the sludge and to aid in the removal of excess water. In one embodiment, the sieve 136 increases the solids concentration of the activated sludge by a factor between about 8 to 15. As shown in FIG. 2, the recovered water may be returned to the headworks of the facility along a path 137.

Following sludge concentration, the concentrated, activated sludge is directed along a flow path 140 to a heat exchanger 143 and a pair of digester tanks 144 and 145. Thus, the digester 150 implemented in the embodiment shown in FIG. 2 uses a two-phase digestion process, in the form of primary and secondary digester tanks, to optimise anaerobic digestion and the collection of methane gas. Those skilled in the art will appreciate, however, that this embodiment provides similar benefits to single phase anaerobic digestion. The concentrated, activated sludge is preheated by the heat exchanger 143 to an elevated temperature that will sustain anaerobic decomposition in the digester 144.

When the digestion process is completed, the digested sludge is transferred to a storage tank 152 along a flow path 154. The stored, digested sludge preferably undergoes a circulation process of decant, disruption and/or digestion as it exits the sludge storage tank 152. This circulation process optimises the generation of bio-gas from the sludge. This circulation process may be continuous or discontinuous. In one preferred embodiment, the stored, digested sludge is initially transferred from the storage tank 152 along flow path 156 to a decanter 138. Thereafter, decanter 138 further concentrates the sludge to an adequate concentration of solids, as with the embodiment described above. This concentrated sludge is recirculated back to the storage tank along a flow path 159. In this way, the desired concentration level of the sludge in the storage tank may be achieved. Alternatively the solids stream leaving the decanter may be routed directly to the classifier 142.

Decanted water obtained in the decanter 138 is returned to the inlet of the wastewater treatment system. After the digested sludge is adequately concentrated, at least a partial stream of the concentrated, digested sludge is drawn from the storage tank 152 along flow path 157 for disruption of the micro-organisms. For example, concentrated, digested sludge may be drawn from the sludge storage tank 152 for disruption at a flow rate of about 0.2 percent of the combined flow rate of primary sludge and biologically activated sludge supplied to the digester(s) 150. As shown in FIG. 2, the concentrated, digested sludge passes through a classifier 142 and a high-pressure homogeniser 146 in the same manner as described in conjunction with FIG. 1.

The disrupted sludge exiting the homogeniser 146 travels along flowpath 158, where the sludge is re-heated by the heat exchanger 143. The disrupted sludge may be mixed with primary sludge from the pre-purification tank 118 transfered along a flow path 120 and/or biologically activated sludge provided from the sieve 136. Although not shown in FIG. 2, this sludge mixing may also occur prior to homogenisation using the high pressure homogeniser 146. The sludge is thereafter returned to the anaerobic digestion system 150.

Periodically, sludge is removed from storage tank 152 along flowpath 160 for disposal. Typically, the sludge is further dewatered by a combination sludge conditioner 162 and filter 164 before it is ready for disposal by incineration or by depositing on agricultural fields and/or landfill. In one preferred embodiment, the combination sludge conditioner 162 and filter 164 increases the solids concentration in the sludge by a factor of at least 3.

FIG. 2 also shows a power conversion unit 166 disposed to recover methane gas provided by the digester tanks 150 along the flow paths 168 and 170. For a treatment plant supplying a combined primary, secondary sludge, and disrupted sludge flow of 53 cubic meters per day ($m^3/d$) at 3.4 percent solids to the anaerobic digesters 150, the anaerobic digesters 150 may be expected to recover bio-gas in the range of 800 cubic meters per day with a 64 percent volume of methane. Of course, methane generation will vary depending on the percentage of volatile organic solids in the digested sludge as will be understood by those skilled in the art. Through the conversion process performed by the power conversion unit 166, an additional source of energy is available for use by the disruption system as well as other parts of the wastewater treatment facility.

Figure 3:
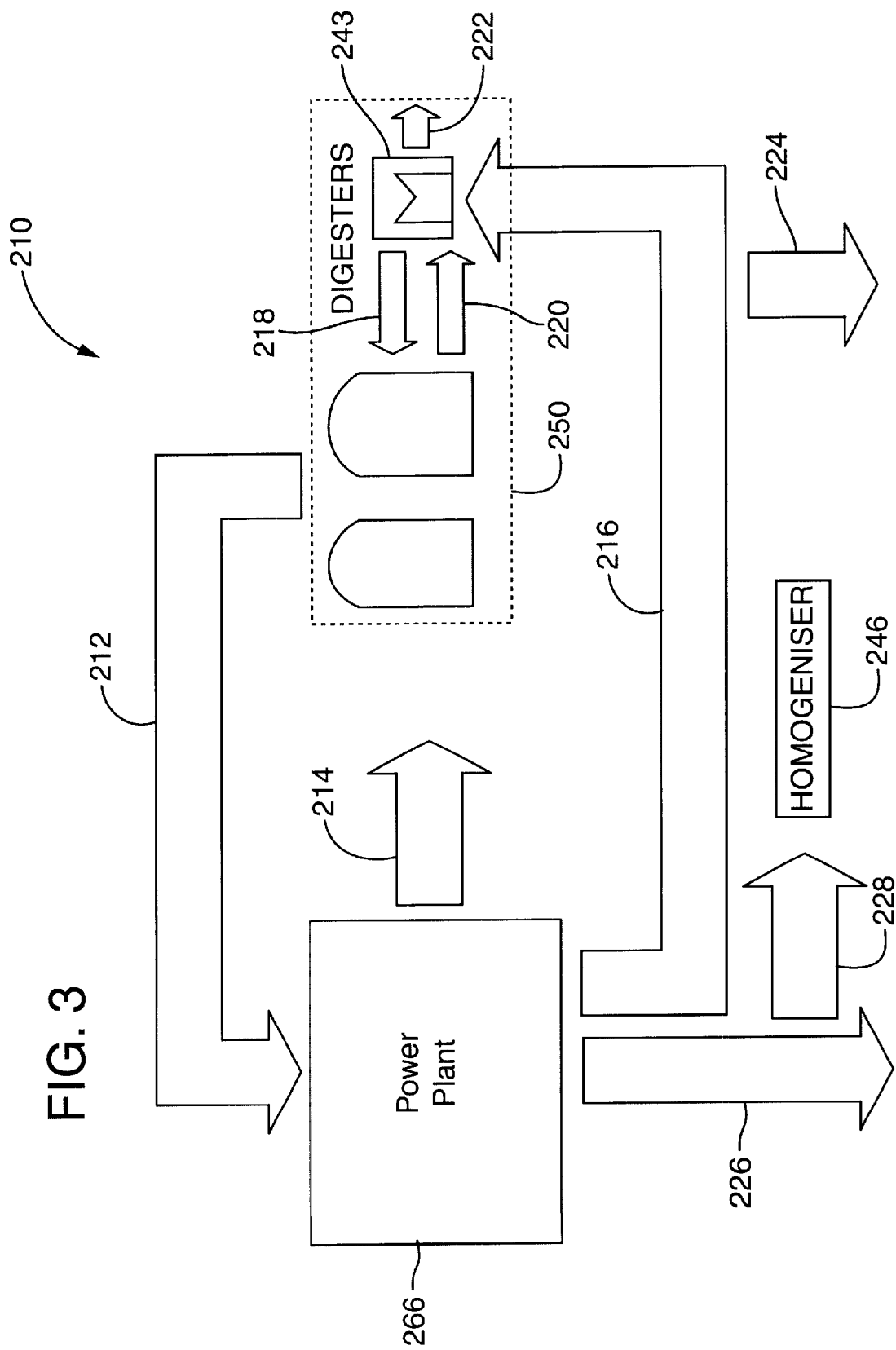
FIG. 3 is a flow diagram illustrating the energy flow associated with the embodiments shown in FIGS. 1 and 2.

FIG. 3 illustrates a flow diagram of the energy balance that may be obtained according to the present invention. As explained below, a greater energy per sludge solids processed may be achieved as compared to state of the art sludge treatment methods.

In FIG. 3, arrows are used to denote the flow of energy in the various portions of a treatment system 210 according to the present invention, as measured in kilowatt-hours per kilogram total solids (kWh/kg TS). The energy content of the biological gas, or methane gas, produced by the digester towers 50, 150 in the embodiments shown in FIGS. 1 and 2 is provided to a combined power conversion plant 266 for the system, as denoted by the arrow 212. In one preferred embodiment, this energy is in the range of 2.5 kWh/kg TS, as compared with 2 kWh/kg TS in systems known in the prior art.

The power plant 266 operates to convert the bio-gas supplied from the digester towers to a usable form of energy. In this conversion process, a certain amount of energy is expected to be lost, as represented by the arrow 214. In one preferred embodiment, this energy loss is in the range of 0.3 kWh/kg TS. The rest of the converted energy can be utilized to self-sustain operation of the treatment system.

There are various energy requirements for operation of the digestion apparatus. For example, the energy required to maintain a proper temperature of a heat exchanger 243 for heating the digested sludge as part of the digestion process is denoted in FIG. 3 as arrow 216, which in a preferred embodiment is in an expected energy range of about 1.2 kWh/kg TS. This permits the digester section 250 to operate at a temperature in the range of 98 to 102° F., as is desirable when optimising the anaerobic digestion of the sludge. Of course, heat will be transferred from the heat exchanger to the digester section. This transfer of energy is denoted in FIG. 3 as arrow 218, about 0.8 kWh/kg TS. Similarly, energy losses, such as through transmission, will occur in the digester section. These losses are denoted by arrow 220, and are on the order of about 0.2 kWh/kg TS. The heat loss based on sludge discharge of the heat exchanger is denoted by arrow 222, and is on the order of about 0.6 kWh/kg TS. Finally, excess heat losses in the system are denoted by arrow 224, and are on the order of about 0.1 kWh/kg TS.

As explained above, the combined power conversion plant generates electrical energy, as denoted by the arrow 226. In a preferred embodiment, the amount of generated electrical energy is about 0.8 kWh/kg TS.

For disrupting sludge, a portion of the generated electrical energy is required, i.e., to operate the homogeniser pump 246. In one embodiment, this energy requirement is denoted by the arrow 228 (e.g. 0.2 kWh/kg TS at 100 bar) That is, the system requires this energy in order to operate the high pressure homogeniser 246 shown in FIG. 3. Of course, any excess generated energy may be utilized in other aspects of the treatment system.

According to the invention, a 25 per cent increase in energy content value may be achieved as compared to state of the art methods. That is, the energy content of the bio-gas generated according to the present invention is 2.5 kWh/kg TS, as compared to 2 kWh/kg TS using state of the art disruption methods. As a result, the invention permits sufficient energy for self-sustaining disruption of the sludge, as well as providing excess energy for use elsewhere, as compared to state of the art sludge treatment methods.

Figure 4:
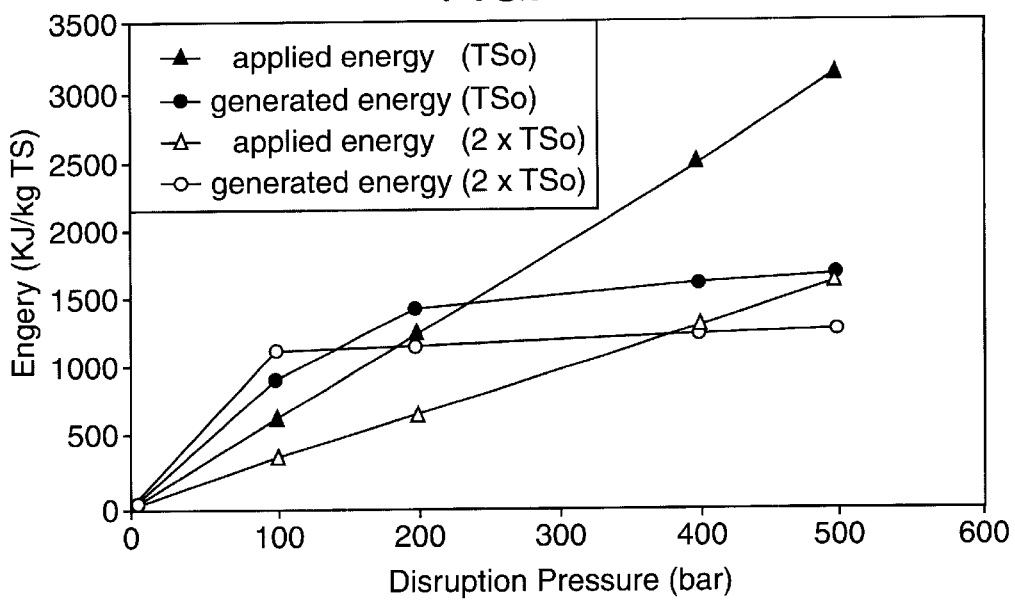
FIG. 4 is a graph illustrating the energy balance for unconcentrated sludge and for concentrated sludge that has been disrupted using a homogeniser operated at various operating pressures.

FIG. 4 shows a diagram in which the energy balance is plotted upon disruption using a high-pressure homogeniser, operated at pressures of 0 to 500 bar. This diagram illustrates applied energy and generated energy for sludge having different concentrations. As can be seen, when the homogeniser according to the invention is operated at a pressure of approximately 200 bar, the applied energy is lower than the generated energy. Thus, in this range, the energy balance is positive. The curves marked with a white triangle or white dot apply to highly concentrated sludge that has been concentrated by a factor of 2. The diagram shows that the applied energy for concentrated sludge also lies below the applied energy for non-concentrated sludge. On the other hand, the generated amount of energy, i.e., the amount of generated methane gas, up to a homogeniser pressure of 200 bar, is greater for concentrated sludge as compared to the generated energy from non-concentrated sludge. The energy balance for concentrated sludge is positive in the homogeniser pressure range of 0 to 400 bar. The largest energy surplus results at a homogeniser pressure of 100 bar.

Figure 5:
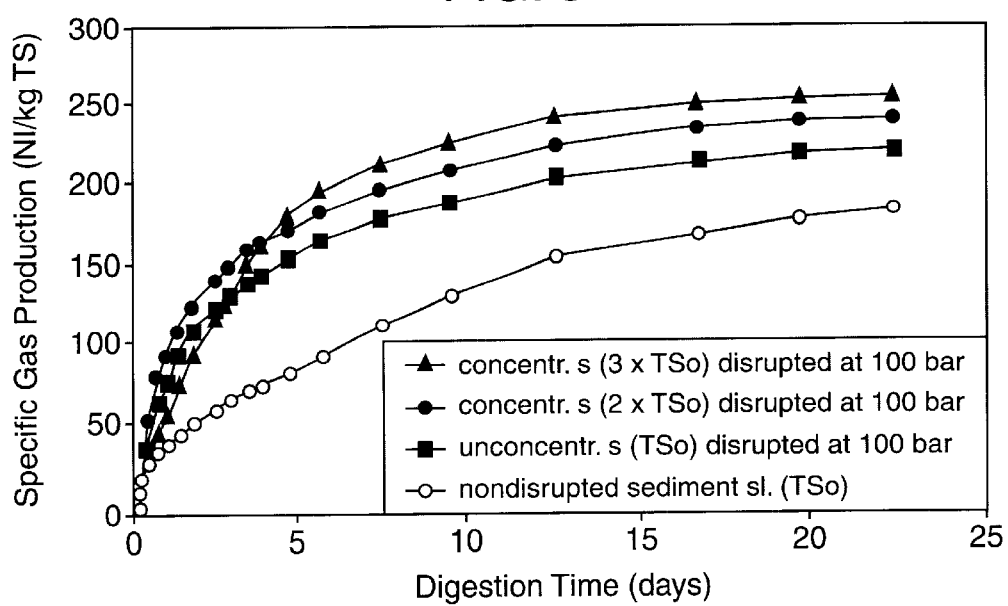
FIG. 5 is a graph illustrating gas production over a period of time for non-disrupted sludge and disrupted sludge at various concentrations at a first operating pressure.

FIG. 5 shows a diagram in which the specific gas production from samples of untreated sludge, disrupted sludge at normal concentration and concentrated sludge (by factors of 2 and 3) is plotted over a period of time. In this case, the observation period is 23 days. As shown, the untreated sludge provides a considerably less methane gas than disrupted sludge. The curve plot of the gas production runs exponentially. The double concentrated sludge produces somewhat more gas than the non-concentrated sludge. The gas curves run almost parallel. It is noticeable that the triple-concentrated sludge produces less gas in the first four days than the less concentrated sludge. The triple-concentrated sludge, however, subsequently reaches its microbiological stability and produces more gas than in the decomposition of less concentrated sludge. The disruption process used in these performance analyses was carried out using a high-pressure homogeniser operated at 100 bar.

Figure 6:
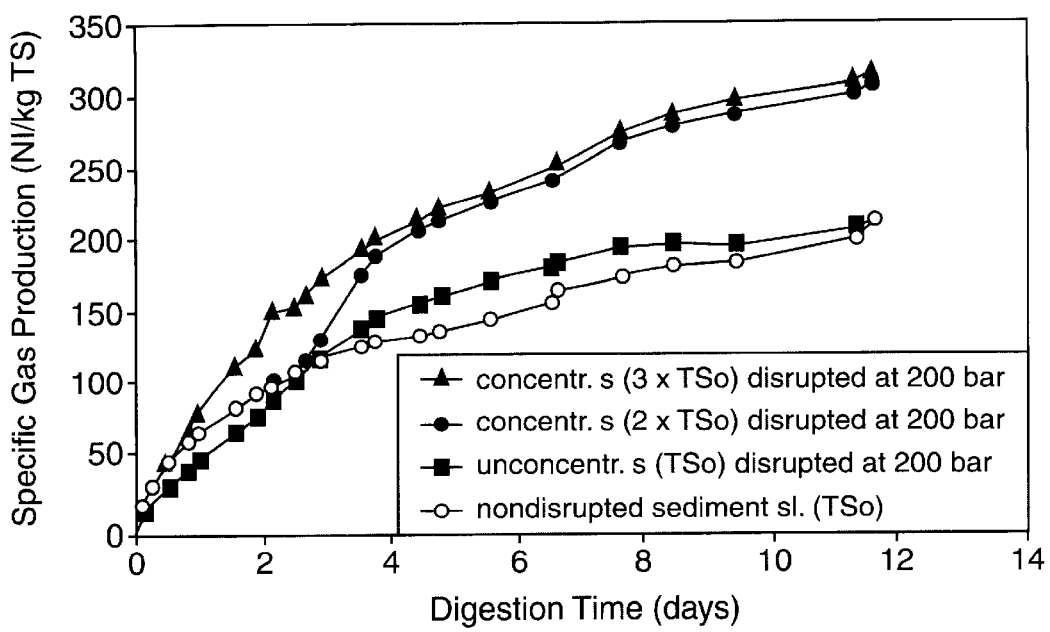
FIG. 6 is a graph illustrating gas production over a period of time for non-disrupted and disrupted sludge at various concentrations at a second operating pressure.

FIG. 6 illustrates test results carried out at a homogeniser pressure of 200 bar. As shown, the gas production of unconcentrated, non-disrupted sludge is almost identical to the non-concentrated disrupted sludge. Thus, by mere disruption, a higher gas yield is generally not achieved. A comparison with the gas production shown in FIG. 5 shows that when using a high-pressure homogeniser at 200 bar, the gas yield is not much higher than at a homogeniser pressure of 100 bar.

Figure 7:
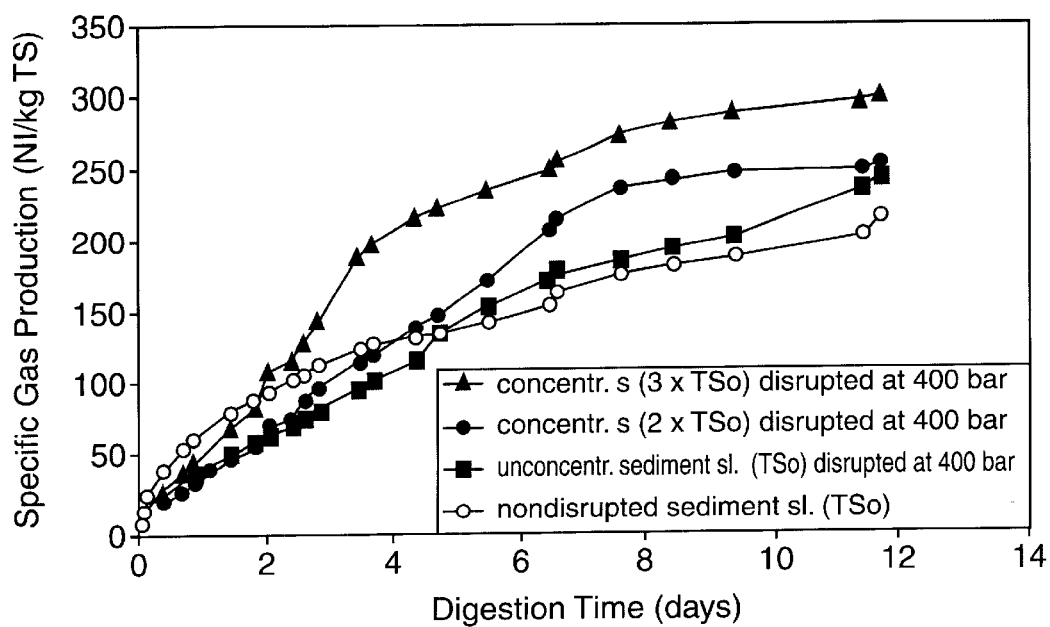
FIG. 7 is a graph illustrating gas production over a period of time for non-disrupted and disrupted sludge at various concentrations at a third operating pressure.

FIG. 7 is a diagram comparable with FIGS. 5 and 6, but operating the high-pressure homogeniser at a pressure of 400 bar. It can be seen that when disruption occurs at a pressure of 400 bar, the gas yield is only be increased by concentrating at a factor of at least 3, in comparison to a homogeniser pressure of 100 bar. A comparison with the test result at 200 bar, which is shown in FIG. 4, shows that the gas yield cannot be further improved with increased homogeniser pressure.

Various advantages flow from the invention. As waste treatment facilities have always been conditioned to obtain improved cost savings, the methodology and system according to the present invention provides a business model that meets such an expectation. That is, the waste treatment facility provides an energy balance that is achieved through careful optimisation of the applied energy as compared to the energy generated therefrom.

Illustrative embodiments of the present invention and certain variations thereof have been provided in the Figures and accompanying written description. However, those skilled in the art will readily appreciate from the above disclosure that many variations to the disclosed system and methodology are possible without deviating from the breadth of the disclosed invention. The variations include, without limitation, partial or substantially complete disruption of the micro-organisms in the sludge with the use of appropriate mixing means, ultrasonic homogenizing means or like apparatus that achieve a similar (or the same) degree of disruption of the micro-organism walls as compared with a homogeniser valve. Likewise, while a series of steps have been summarized for carrying out an optimising method according to the invention, steps may be added, removed or modified without departing from the scope of the invention. Therefore, the invention is not intended to be limited to the disclosed embodiments. To the contrary, the present invention is intended to cover the disclosed embodiments as well as others falling within the scope and spirit of the invention to the fullest extent permitted by law in view of this disclosure and the inventions defined by the claims herein below.

What is claimed:

1. A method for treating sludge generated in a wastewater treatment system, comprising the steps of:

concentrating the sludge to increase the percent solids content by at least 1.5;

selecting a desired homogenizing pressure based on an input energy required to disrupt the sludge;

disrupting at least a portion of the cellular matter in the concentrated sludge at the desired homogenizing pressure;

digesting the disrupted sludge to produce methane gas; and converting the methane gas to an available energy source that may be input to the wastewater treatment system, the input energy required to disrupt the sludge being substantially the same or greater than the input energy requirement.

2. The method according to claim 1, wherein the disrupting step is performed at a homogenizing pressure less than about 400 bar.

3. The method according to claim 1, wherein the disrupting step is performed at a pressure in a range of between about 50 bar and about 400 bar.

4. The method according to claim 1, further comprising the step of classifying the sludge to remove impurities therefrom, the classifying step being performed prior to the disrupting step.

5. The method according to claim 4, wherein the classifying step is performed with the use of a grit vortex device.

6. The method according to claim 1, wherein the digestion step comprises passing the disrupted sludge to a first anaerobic digestion tank for at least partially digesting the disrupted sludge, and then passing at least a portion of the partially digested to a second anaerobic digestion tank.

7. The method according to claim 6 wherein the sludge is digested in a series of anaerobic digestion tanks.

8. The method according to claim 7 wherein disruption occurs in between any or all of the anaerobic digestion tanks.

9. The method according to claim 8 wherein disruptions of the primary and biologically activated sludges occur before mixing both.

10. The method according to claim 8 wherein multiple disruption occurs at low pressures between anaerobic digesters.

11. The method according to claim 1, wherein the sludge disrupting step is performed as a continuous step.

12. The method according to claim 1, wherein the sludge disruption step is performed discontinuously.

13. The method according to claim 1, wherein the sludge is biologically activated sludge.

14. The method according to claim 1, wherein the sludge is primary sludge.

15. The method according to claim 1, wherein the sludge is a mixture of biologically activated sludge and primary sludge.

16. The method according to claim 1, wherein the sludge is stabilised sludge.

17. The method according to claim 1, wherein the sludge is a mixture of stabilised, biologically activated, and primary sludge.

18. The method according to claim 1, wherein the concentrating step and the disrupting step are performed on a fraction of the sludge stream.

19. The method according to claim 1, wherein the concentrating step is performed with the use of a decanter or other centrifugal separation device.

20. The method according to claim 1, wherein the concentrating step is performed by sedimentation.

21. The method according to claim 1, further comprising the step of removing heavy metals and/or humic substances from the sludge either before or after disruption prior to digestion.

22. A system for optimizing an energy balance associated with the treatment of wastewater comprising:

a settling tank section disposed to receive the wastewater and produce a secondary sludge having a first concentration;

a decanter section disposed to receive the secondary sludge and to provide a concentrated sludge having a solids content that is substantially greater than the first concentration;

a homogeniser disposed to receive the concentrated sludge and to disrupt cellular material present in the concentrated sludge, the homogeniser operating at a pressure based on a selected input energy to provide a disrupted sludge; and an anaerobic digestion section disposed to digest the disrupted sludge to produce methane gas that is capable of being converted to an output energy substantially the same as or greater than the input energy.

* * * * *

UNITED STATES PATENT AND TRADEMARK OFFICE
CERTIFICATE OF CORRECTION

PATENT NO.    : 6,444,124 B1
DATED         : September 3, 2002
INVENTOR(S)   : Theodore Onyeche and Michael Sievers It is certified that error appears in the above-identified patent and that said Letters Patent is hereby corrected as shown below:

<u>Title page,</u>
Item [30], Foreign Application Priority Data, change the date from:
"Aug. 27, 1999" to read: -- Aug. 28, 1999. --

Signed and Sealed this

Ninth Day of September, 2003

JAMES E. ROGAN
*Director of the United States Patent and Trademark Office*